United States Patent Office 3,137,579
Patented June 16, 1964

3,137,579
PROCESS FOR MANUFACTURING STARCH-BASE JELLY CANDY
John W. Robinson, Blue Mound, Ill., assignor to A. E. Staley Manufacturing Company, Decatur, Ill., a corporation of Delaware
No Drawing. Filed Nov. 1, 1962, Ser. No. 234,861
5 Claims. (Cl. 99—134)

My invention relates to a process for producing starch-base jelly candy. More particularly, my invention relates to a process for the production of starch-base jelly candy of improved quality made by the high pressure cooking of mixtures of starch, sugar, water and corn syrup.

During recent years, continuous high pressure cooking methods have been developed for the making of starch-base jelly candy. One highly successful method is described in U.S. Patent 2,678,276, which issued May 11, 1954, to Richard M. North. This method, in general, consists of cooking in a pressurized cooking zone a mixture of sucrose, starch, water and corn syrup, the amount of starch being about 4½ to 7½ pounds per gallon of water at temperatures ranging from about 250 to 300° F. for a period less than about one minute. The cooked material produced by this method can then easily be formed into starch-base jelly candies. Such continuous pressurized methods have, for the most part, replaced the old and familiar batch processes in the starch-base jelly candy industry. In the main, this replacement was caused by the economies made possible by the continuous process. For example, in order to effect gelatinization of starch when utilizing the batch type cooking methods, it is necessary to use a much larger proportion of water than is required by the continuous pressurized processes. It is then necessary to boil off the excess water from the batch cooking operation. Also, the batch cooking processes are slow and time consuming and require highly skilled personnel for proper operation, thus requiring a high number of man-hours to produce a given amount of candy. With the advent of the pressurized continuous cooking methods, not only the man-hours required to produce a given amount of candy was reduced but the degree of skill necessary to suitably operate the cooking apparatus was reduced. In spite of the obvious advantages outlined above which were presented to the art by the continuous pressurized candy cooking methods, certain drawbacks arose from the use of these processes. Among these drawbacks is the poor quality of the starch-base jelly candy produced. Candy produced by presently utilized continuous pressurized processes tends to lose the desired "stringy," tender texture and is often tough and rubbery. Stringiness is the tendency of good quality starch-base jelly candy to form a long string at the point of separation when the candy is pulled apart. A further disadvantage in utilizing present continuous pressurized methods arises from the fact that the optimum temperature ranges required to properly prepare the starch-base jelly candies from specific formulations is usually quite narrow, often only allowing for errors of 1 or 2 degrees. Theoretically, with modern temperature controls, this would occasion no difficulty. However, the problem of keeping temperature controls in optimum condition requires constant checking and repair which alone can result in loss of working time and even in long and expensive shutdowns.

Accordingly, the principal object of this invention is to provide a cooking method by which high-quality, starch-base jelly candies not possessing the named drawbacks of candies produced by prior art continuous process procedures can be made while still utilizing the basic continuous pressurized cooking method.

A further object of this invention is to provide a less sensitive cooking method which permits the use of wider ranges of optimum temperatures in cooking the various starch-base jelly candy formulations.

To satisfy the above objects, I have now discovered an improved process for preparing starch-base jelly candies by a continuous pressurized method. My new process possesses none of the previously named drawbacks of prior continuous pressurized methods in that candy produced by my improved method is of high general quality possessing the desired stringy, tender texture not possessed by candies produced by prior continuous pressurized methods. Further my new process permits an increase in the rate of candy production without a concurrent increase in the amount of pressurized cooking equipment required in that in my new method it is necessary to pass only a part of the total candy formulation through the pressurized cooker. In addition, my improved process incorporates all of the economies of prior continuous pressurized methods and can be easily and conveniently adapted to existing continuous pressurized candy cooking apparatus.

Generally, my improved process consists of cooking a mixture of starch, water and sugar such as sucrose or combinations of sucrose and dextrose, the ratio of starch to water being from about 6 to about 12 pounds of starch for each gallon of water at temperatures ranging from 220 to about 240° F. under superatmospheric pressures for no more than about 2 minutes. Then, after completion of the cooking step, adding hot corn syrup, the hot corn syrup having an addition temperature of close to its boiling point, for example, in the range of from about 215 to about 240° F. the addition being accomplished within not more than one minute after completion of the cooking step and then causing the resulting mixture to cool to form starch-base jelly candy.

The ratio of starch to water in the cooking step of my improved process can range from about 6 to about 12 pounds of starch for each gallon of water. However, when I utilize temperatures in the range of 220–230° F., I generally prefer to use less than about 8 pounds of starch for each gallon of water while when I utilize temperatures in the range of 230 to 240° F., I prefer to utilize more than 8 pounds of starch for each gallon of water. It must be realized that when combinations of high temperatures and high proportions of starch to water are utilized, candy having a relatively high degree of firmness will be produced. On the other hand, when the low temperatures and low proportions of starch to water are utilized, candy having less firmness will be produced.

In order to obtain a starch-base jelly candy of high quality, it is necessary not to carry out cooking step of my process for more than 2 minutes. It is also necessary to blend the cooked material with the hot corn syrup within one minute after completion of the cooking step.

As is customary, suitable coloring and flavoring agents may be added. It is generally preferable to add the flavoring and coloring agents after the blending or "addition" step of my improved process.

In carrying out my improved process, I can use any suitable starch-base jelly candy formulation requiring sugar, water, corn syrup and starch. Conveniently used formulations can contain 10 to 15% water, 20 to 30% sugar, 45 to 60% corn syrup, the corn syrup preferably having a dextrose quivalent (D.E. of from 35 to 65 and 7 to 15% starch, all percentages by weight based on the weight of the total formulation and in each instance totalling 100%. Any suitable sugar can be utilized which is selected from the group consisting of sucrose and mixtures of sucrose and dextrose provided, that the above stated ratios of starch to water in the cooking step are maintained. In addition, any suitable starch which is satisfactorily used by the art in producing starch-base jelly candy can be employed in my process.

Any suitable continuous pressurized cooking apparatus can be utilized or adapted for use in my process. Suitable apparatus for adaptation to my process is fully described in the previously named patent to North. Simply stated, the apparatus described by North consists of a make-up kettle, which is connected by a conduit to a pressurized steam-cooking chamber, which is, in turn, connected by a second conduit to a holding kettle. My new process can be adapted to the apparatus described by North by merely adding a third kettle connected by a third conduit to the holding kettle or to the second conduit.

In carrying out the process of my invention utilizing the described adapted apparatus, I can prepare a mixture of starch, water and a sugar selected from the group consisting of sucrose, and mixtures of sucrose and dextrose, the said mixture containing from about 6 to about 12 pounds of starch for each gallon of water, pass the mixture from the make-up kettle through the first conduit to the pressure cooking chamber wherein the said mixture is cooked at temperatures ranging from about 220 to 240° F. to form a cooked material. After a cooking period of not in excess of two minutes, the cooked material can then be passed through the second conduit to the holding kettle and therein blended with hot corn syrup from a third kettle according to the process of my invention or the hot corn syrup can be fully or partially blended with the cooked material before entrance into the holding kettle by passing the hot corn syrup through the third conduit directly into the second conduit. The thus obtained material can then be flavored and colored and then cooled to form starch-base jelly candy by any suitable method known to the candy making art.

It will become readily apparent to the art that my process can be adapted to many and varied types of pressurized continuous cooking devices and that the above description of apparatus merely represents one convenient means for carrying out my improved process. For example, the cooking devices described in U.S. Patent 2,919,214 to O. R. Etheridge, issued December 29, 1959, and in U.S. Patent 2,940,876 to N. E. Elsas, issued June 14, 1960, can be satisfactorily adapted for use in my method.

The following examples more fully describe my invention; however, I do not intend to be limited to the materials, proportions, specific combinations of ingredients, apparatus, etc., included therein. I intend to include all equivalents obvious to those skilled in the art.

*Example I*

A mixture containing 23.4 pounds sucrose, 10.9 pounds thin-boiling confectioners' starch and 1.4 gallons of water was thoroughly blended by agitation in a stainless steel blending kettle at about 165–180° F. The blended material was then passed by a pipe to a steam injection cooker and cooked for a one-minute period at about 230° F. At the end of the one minute period, the cooked material was passed to a holding kettle. To the material in the holding kettle was immediately added with accompanying agitation, a 54.3 pound portion of corn syrup having a D.E. of 64, the corn syrup having a temperature of about 220–230° F. The combined material was then passed into starch-base jelly candy molds formed from confectioners' molding starch and allowed to cool to obtain starch-base jelly candy.

*Example II*

A mixture containing 35.0 pounds of a combination of 30.0 sucrose and 5.0 dextrose, 10.9 pounds of thin-boiling confectioners' starch and 1.8 gallons of water was thoroughly blended with accompanying agitation in a stainless steel blending kettle at about 170 to 180° F. The blended material was then passed through a pipe to a steam injection cooker and cooked for a period of about 1½ minutes at about 225° F. At the end of the 1½ minute period, the cooked material was passed to a holding kettle, the said holding kettle containing a 39.1 pound portion of corn syrup having a D.E. of 42, the corn syrup having a temperature of about 230 to 235° F. The combined material was then cast into starch-base jelly candy molds formed from confectioners' molding starch and allowed to cool to obtain starch-base jelly candy.

Candies produced by the methods of Examples I and II were examined and were found to be of high quality. The candies were firm with a stringy, tender texture.

Since many embodiments of this invention may be made and since many changes may be made in the embodiments described, the foregoing is to be interpreted as illustrative only, and my invention is defined by the claims appended hereafter.

I claim:

1. A process for manufacturing starch-base jelly candy which comprises cooking a mixture of starch, water and a sugar selected from the group consisting of sucrose and combinations of sucrose and dextrose at temperatures ranging from about 220 to 240° F. under superatmospheric pressures for a period not in excess of 2 minutes to form a mixture, the amount of starch ranging from about 6 to about 12 pounds of starch for each gallon of water, providing hot corn syrup having a temperature ranging from about 215 to about 240° F., combining the said hot corn syrup with the said mixture to form a combined material, the combination being accomplished in not more than one minutes after completion of the said cooking and then forming starch-base jelly candy from the said combined material.

2. The process of claim 1 wherein the amount of starch ranges from about 6 to about 8 pounds of starch for each gallon of water and the temperature ranges from about 220° to about 230° F.

3. The process of claim 1 wherein the amount of starch ranges from about 8 to about 12 pounds of starch for each gallon of water and the temperature ranges from about 230° to about 240° F.

4. The process of claim 1 wherein the sugar is sucrose.

5. The process of claim 1 wherein the sugar is a combination of sucrose and dextrose.

References Cited in the file of this patent

UNITED STATES PATENTS

| | | |
|---|---|---|
| 2,678,276 | North et al. | May 11, 1954 |
| 3,062,661 | Doumak | Nov. 6, 1962 |